US011069085B2

(12) United States Patent
Walls et al.

(10) Patent No.: US 11,069,085 B2
(45) Date of Patent: Jul. 20, 2021

(54) LOCATING A VEHICLE BASED ON LABELING POINT CLOUD DATA OF A SCENE

(71) Applicant: Toyota Research Institute, Inc., Los Altos, CA (US)

(72) Inventors: Jeffrey M. Walls, Los Altos, CA (US); Ryan W. Wolcott, Los Altos, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 45 days.

(21) Appl. No.: 16/274,402

(22) Filed: Feb. 13, 2019

(65) Prior Publication Data

US 2020/0257901 A1 Aug. 13, 2020

(51) Int. Cl.
| | |
|---|---|
| *G06T 7/73* | (2017.01) |
| *G05D 1/02* | (2020.01) |
| *G06K 9/62* | (2006.01) |
| *G06K 9/00* | (2006.01) |
| *G01C 21/36* | (2006.01) |

(52) U.S. Cl.
CPC ............ *G06T 7/74* (2017.01); *G01C 21/3602* (2013.01); *G05D 1/0274* (2013.01); *G06K 9/00718* (2013.01); *G06K 9/00791* (2013.01); *G06K 9/6201* (2013.01)

(58) Field of Classification Search
CPC .... G06T 7/74; G06K 9/6201; G06K 9/00718; G06K 9/00791; G01C 21/3602; G05D 1/0274
See application file for complete search history.

(56) References Cited

U.S. PATENT DOCUMENTS

| | | | |
|---|---|---|---|
| 8,605,998 B2 | 12/2013 | Samples et al. | |
| 9,194,949 B2 | 11/2015 | Becker et al. | |
| 9,221,396 B1 | 12/2015 | Zhu et al. | |
| 9,516,218 B1* | 12/2016 | Tohidi | G06K 9/6218 |
| 9,792,521 B2 | 10/2017 | Modica et al. | |
| 9,868,446 B1 | 1/2018 | Zhu et al. | |
| 2012/0106797 A1* | 5/2012 | Wang | G06K 9/00771 |
| | | | 382/103 |
| 2015/0169987 A1* | 6/2015 | Nalawadi | G06F 16/583 |
| | | | 382/203 |
| 2015/0206023 A1 | 7/2015 | Kochi et al. | |
| 2017/0220887 A1 | 8/2017 | Fathi et al. | |
| 2017/0242442 A1 | 8/2017 | Minster | |
| 2017/0300737 A1 | 10/2017 | Wang | |

(Continued)

OTHER PUBLICATIONS

Wolcott, R. M. Eustice, "Visual localization within LIDAR maps for automated urban driving", Proc. IEEE/RSJ Int. Conf. Intell. Robots Syst., pp. 176-183, 2014.

*Primary Examiner* — Casey L Kretzer
(74) *Attorney, Agent, or Firm* — Oblon, McClelland, Maier & Neustadt, L.L.P.

(57) ABSTRACT

A point cloud management system provides labels for each point within a point cloud map. The point cloud management system also provides a method to localize a vehicle using the labeled point cloud. The point cloud management system identifies objects within a scene using an obtained image. The point cloud management system labels the identified objects to register the identified objects against the point cloud. The registration of the objects is then used to localize the vehicle.

14 Claims, 7 Drawing Sheets

(56) References Cited

U.S. PATENT DOCUMENTS

| | | |
|---|---|---|
| 2017/0357873 A1* | 12/2017 | Roimela .................. G06T 7/001 |
| 2017/0371348 A1 | 12/2017 | Mou |
| 2018/0005407 A1 | 1/2018 | Browning et al. |
| 2019/0003838 A1* | 1/2019 | Kudrynski .............. G01C 21/30 |
| 2019/0213790 A1* | 7/2019 | Taguchi ............. G01C 21/3673 |
| 2019/0318502 A1* | 10/2019 | He ........................... G06N 3/08 |
| 2020/0210715 A1* | 7/2020 | Golomedov ....... G06K 9/00818 |
| 2021/0043002 A1* | 2/2021 | Zeng ....................... G06T 19/00 |

* cited by examiner

LOCATING A VEHICLE BASED ON LABELING POINT CLOUD DATA OF A SCENE

BACKGROUND

Technical Field

The present disclosure relates to a point cloud labeling system registering objects within a point cloud of the environment for localization.

With the spread of satellite position technology, new industries such as autonomous vehicles and navigation systems are considered. Autonomous vehicles are becoming more common on roadways, however, one of the larger costs to entry of autonomous vehicles is sensor systems (e.g., light detection and ranging (lidar) sensor/scanner) for better travel. In order to provide more accurate localization with older, less accurate, and/or cheaper sensors (e.g., cameras) better map knowledge is necessary. This detailed map information provides more accurate localization through accurate object labeling.

Autonomous and semi-autonomous vehicles are mounted with a large number of autonomous sensors such as cameras, radars/lidars, global positioning systems, etc. to observe the surrounding environment of a vehicle and determine information necessary for travel. Such information for travel may provide for navigation through a particular roadway through localization of the vehicle.

SUMMARY

When a 3-dimensional (3D) point cloud is generated, each point within the point cloud may contain different information describing the point. Generation of 3D point clouds may be by a map service provider through use of a lidar sensor on a vehicle passing through roadways. Each point within the point cloud is often provided with information describing the point through manual entry or object identification. However, the 3D point clouds may be labeled inconsistently or inaccurately due to being out of date, not being detailed enough, or unclear based on collected inputs. Additionally, the entrance cost of providing autonomous and semi-autonomous vehicles with extremely accurate lidar sensors is prohibitive to consumers. Thus, a way to use less accurate, cheaper sensors such as cameras reduces the costs of entry for autonomous and semi-autonomous vehicle navigation/travel.

The present disclosure is provided for solving, among other things, the above-mentioned problem of how best to label points within a 3D point cloud and localize a vehicle using less accurate sensors (e.g., cameras). The present disclosure describes point cloud management system which generates labels for a 3D point cloud and based on the labeling of the points, a localization for a user.

According to the present disclosure, it is possible to generate and use a labeled 3D point cloud for localization.

DETAILED DESCRIPTION

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

Figure 1:
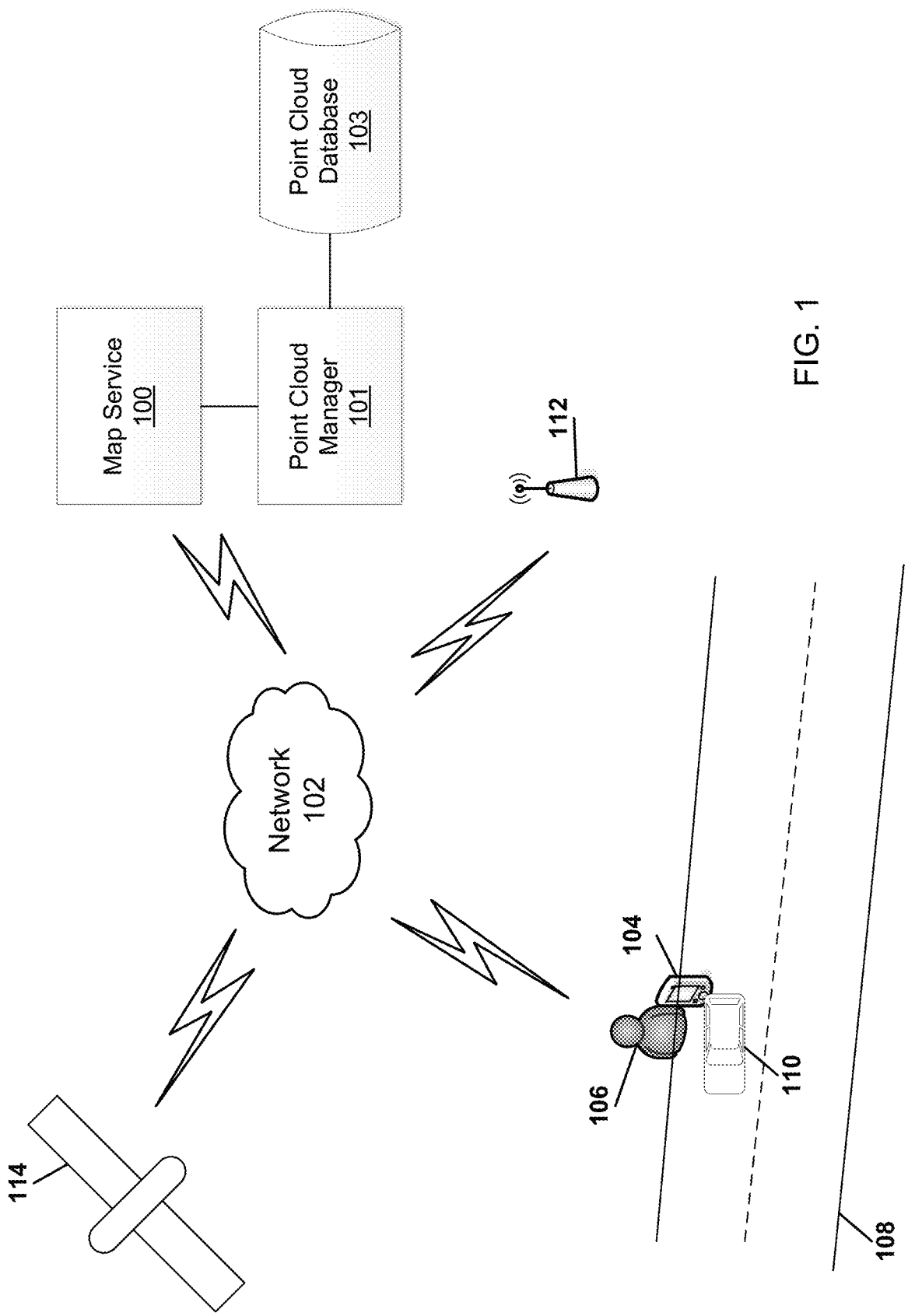
FIG. 1 shows a schematic diagram of a point cloud management system according to one exemplary embodiment.

FIG. 1 shows a schematic diagram of a map information management system according to one exemplary embodiment. In FIG. 1, a server 100, providing a map service, may receive the data inputs from the users via a network 102. The users may transmit information about environmental objects along a path of travel. The server 100 is further described as connected to a point cloud manager 101 which may include a device, application, or circuitry which is capable of accessing a point cloud database 103. In other embodiments, the map service server 100 may include the point cloud manager 101 as a component or unit of the same server 100 (hereinafter, the server 100 and point cloud manager 101 may be used interchangeably for the same point cloud manager). The point cloud database 103 may include information about points within the 3D point cloud such as locations and labels for points within the point cloud. The labels may include environmentally occurring objects along a way of travel (i.e., roadway) including surrounding constructions (e.g., buildings; building characteristics such as doors, garages, windows; bridges; archways; tunnels; etc.), road geometry, signage, road shapes, traffic construction points, naturally occurring elements (e.g., trees, bushes, lakes, rivers), and the like.

Figure 5:
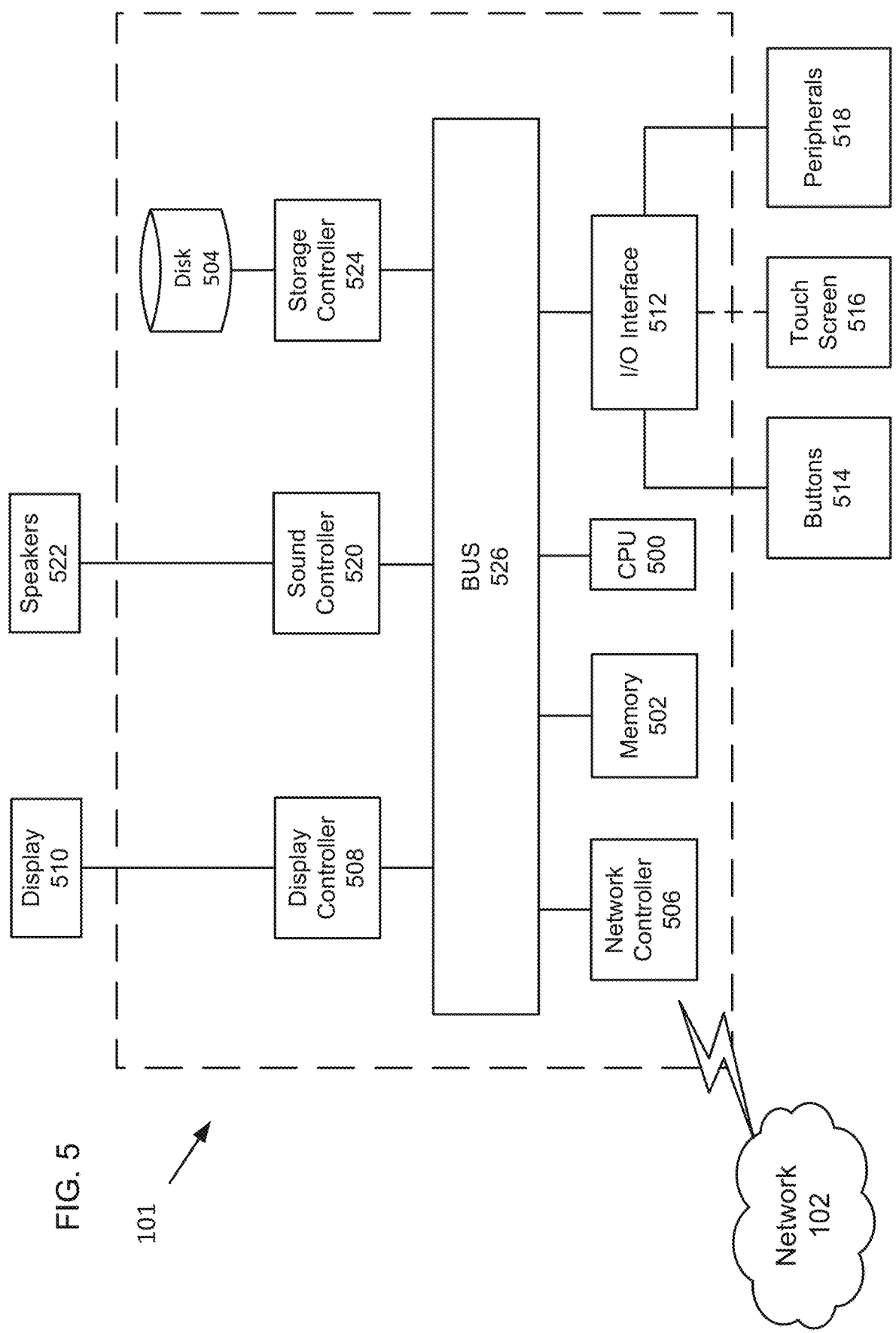
FIG. 5 shows an exemplary block diagram of a server according to one exemplary embodiment.

A mobile device 104 associated with a user 106 may connect to the server 100 via the network 102. The mobile device 104 represents one or more mobile devices connected to the server 100 via the network 102 to upload the data inputs and/or update and present map information to the user 106 of the mobile device 104. The server 100 is one or more servers that provide map and navigation services to users 106 of mobile devices 104. The network 102 is any network that allows the mobile devices and the servers to communicate information with each other over computer network. The server 100 includes a CPU 500 and a memory 502, as shown in FIG. 5.

The network 102 may include the Internet or any other network capable of communicating data between devices. Suitable networks can include or interface with any one or more of a local intranet, a PAN (Personal Area Network), a LAN (Local Area Network), a WAN (Wide Area Network), a MAN (Metropolitan Area Network), a VPN (Virtual Private Network), or a SAN (storage area network). Furthermore, communications may also include links to any of a variety of wireless networks, including WAP (Wireless Application Protocol), GPRS (General Packet Radio Service), GSM (Global system for Mobile Communication), CDMA (Code Division Multiple Access) or TDMA (Time Division Multiple Access), cellular phone networks, GPS (Global Positioning System), CDPD (Cellular digit packet data), Bluetooth radio, or an IEEE 802.11 based radio frequency.

The mobile device 104 includes a mobile telephone, a laptop, a smart phone, a tablet PC, cellphones, wireless phones, pagers, electronic organizers, PDAs, devices integrated into the vehicle 110, or the like.

The mobile device 104 includes sensors and/or is capable of accessing sensors on vehicle 110 to collect data about the roadway and its surroundings. These sensors may include at least lidar, radar, inertial measurement units (IMUs), and camera units. In other embodiments, sensors such as camera units from the mobile device 104 may be used to collect data about the roadway and its surroundings.

In one embodiment, the server 100 may use the mobile device's 104 location to determine the vehicle's 110 general geographic location. The mobile device's 104 location can be determined via various satellite-based positioning systems known in the art. For example, the mobile device 104 may include a location detector. The location detector may be a GPS (Global Positioning System) module for detecting a current geographical location of the mobile device. FIG. 1 shows a satellite 114. In one embodiment, the mobile device's location is determined via a cellular tower 112 with which communication has been established using current technology such as GMS (Global System for Mobile) localization, triangulation, Bluetooth, hotspots, WiFi detection, or other methods as would be understood by one of ordinary skill in the art. In one embodiment, the mobile device's location is determined by the network 102. In particular, the CPU 500 may detect a location of the mobile device 104 as a network address on the network 102. The CPU 500 may also store the location of the mobile device 104 in the memory 502.

FIG. 1 also depicts a road 108 that is part of the network of roads in a geographic area. The vehicle 110 is shown as traveling on the road 108. The vehicle 110 may be a car, a motorcycle, a boat, a bicycle, an autonomous or semi-autonomous vehicle or any other structure used for transportation that may include sensors for viewing the environment surrounding the vehicle.

Figure 2:
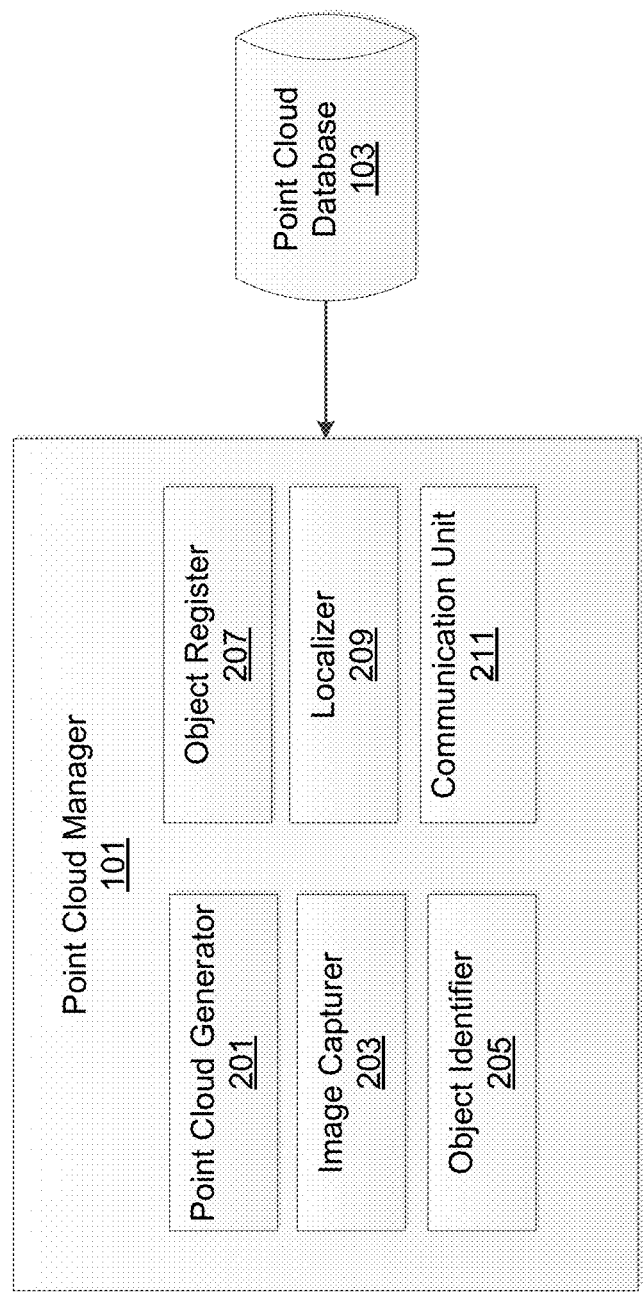
FIG. 2 shows a diagram illustrating a configuration of a point cloud management device of the map service according to one exemplary embodiment.

FIG. 2 shows a diagram illustrating a configuration of a point cloud management device of the map service according to one exemplary embodiment. The point cloud manager 101 includes modules such as a point cloud generator 201, image capturer 203, object identifier 205, object register 207, localizer 209, and communication unit 211. The modules described herein may be implemented as either software and/or hardware modules and may be stored in any type of computer-readable medium or other computer storage device. For example, each of the modules described herein may be implemented in circuitry that is programmable (e.g. microprocessor-based circuits) or dedicated circuits such as application specific integrated circuits (ASICS) or field programmable gate arrays (FPGAS). In one embodiment, a central processing unit (CPU) could execute software to perform the functions attributable to each of the modules described herein. The CPU may execute software instructions written in a programing language such as Java, C, or assembly. One or more software instructions in the modules may be embedded in firmware, such as an erasable programmable read-only memory (EPROM). Each module may work in conjunction with another module to accomplish their various tasks.

The point cloud generator 201 may information from sensors of a vehicle 110 for processing (e.g., lidar). Each vehicle 110 and mobile device 104 may include different sensors (e.g., lidar, cameras, IMUs, etc.), thus, the point cloud generator 201 may use the communication unit 211 to communicate with the mobile device 104 to identify the sensors from the vehicle 110 and/or mobile device 104 which may be used to label the 3D point cloud. The point cloud generator 201 may then retrieve the environment information from the sensors of the vehicle 110 through communication with either the vehicle 110 communications unit(s) and/or the sensors themselves. In many cases, the retrieved/collected environmental information will be in the form of an orthographic map of ground-plane reflectivities collected from a lidar sensor. Further, the sensors may provide a location for the vehicle 110 or user 106 location (e.g., using GPS), as well as, locations of objects in the environmental information through various means, such as through location triangulation or determining distance calculations using image processing.

During or upon collection of environmental information from the sensors (e.g., lidar), the image capturer 203 collects images from the same or other sensors (e.g., cameras), to be used to identify objects within the environmental information. Each image includes a time and location of collection which will affect the visual intensity of objects and provide the ability to determine changes to an object over time. The object identifier 205 may rely on semantic querying, pattern/image recognition, and other machine learning methods to determine objects within the environmental information. For example, the object identifier 205 may rely on a semantic segmentation algorithm to identify objects within the image and label each pixel of the image according to the identification of the respective object. The object identifier 205 may also add images of the same object over a time period to more accurately determine an identification of the object.

The objects may further be separated into various classes, such as signage (e.g., speed limits, stop signs, yields, etc.), road markings (high occupancy vehicle, bike lanes, lane markings, lane configuration, etc.), buildings (e.g., walls, windows, entry ways, bridges, overpasses, utility poles, mailboxes, fire hydrants, etc.), road boundaries (e.g., walls, on/off ramps, multiple level roadways, guard rails, islands, curbs, speed bumps, on-off ramps, shoulders, etc.), construction (e.g., cones, caution tape, barriers, construction signs, etc.), nature (e.g., trees, rock outcroppings, embankments, bushes, etc.), dynamic objects (e.g., vehicles, animals, people, other transitory objects), and the like. The point cloud generator 201 may also, using the object identifier 205, semantically label the 3D point cloud with the particular object class associated with the object in the environment. Each point in the point cloud being labeled and associated with the object class.

The object identifier 205 may further determine objects based on the time of day and generalized location to determine visual intensity of objects within the image and adapt to the visibility of the objects in the image. For example, near dusk or dawn an object may be further obscured by contrast or glare, and would require further analysis and/or use fewer characteristics for an identification with the caveat of increased tolerance. Additionally, the object identifier 205 may determine objects through dynamic image element removal, such as by removing objects which are interfering with a view of objects within the image. The removed obscuring objects may also be of specific class types such as vehicles, animals, people, other transitory objects which the foregoing classes might use, etc. For example, by removing vehicles or animals which obscure view of the objects in the image.

The object identifier 205, based on the size, shape, and movement of the obscuring objects may change the tolerance for an identification of an object. For example, the identification tolerance may be higher for an object that is mostly covered, whereas, identification tolerance for an object which is only covered or obscured for a millisecond is lower. The object identifier 205 may also account for the inertial motion of the vehicle 110 or user 106 during the identification of the objects in the image. The tolerance in the identified objects may also determine whether particular point labels in the 3D point cloud are updated, added, or changed. For example, higher tolerance could describe inaccuracies in the identified object and would thus leave corresponding points of the 3D point cloud unchanged, and lower tolerance would describe an accurately identified object which could update the number of points with the label or change particular labels of a set of corresponding points.

The object identifier 205 may label both the 3D point cloud as well as the identified objects within the image. Thus, the object identifier 205 provides consistent labeling rules to the objects in both the 3D point cloud and images. The object identifier 205 may determine particular identified objects to be within particular classes based on an algorithm.

The object register 207 may then label the identified objects with their identified class and register the object to the 3D point cloud. The registration of the object may be through projection of the object, as a whole, on to the 3D point cloud. Each point within the 3D point cloud that coincides with the identified object may then be labeled with the same class identifier. In other embodiments, the fully labeled image is registered against the 3D point cloud so that each point in the point cloud is labeled with the same label as the coinciding pixel of the image.

The localizer 209 may, based on results of the object register 207, may determine the location of the vehicle 110 and/or mobile device 104 based on the position in the 3D point cloud map which most closely registers with the image. The localizer 209 may also add multiple images and object registrations to better determine the particular location of the vehicle 110 and/or mobile device 104.

Figure 3:
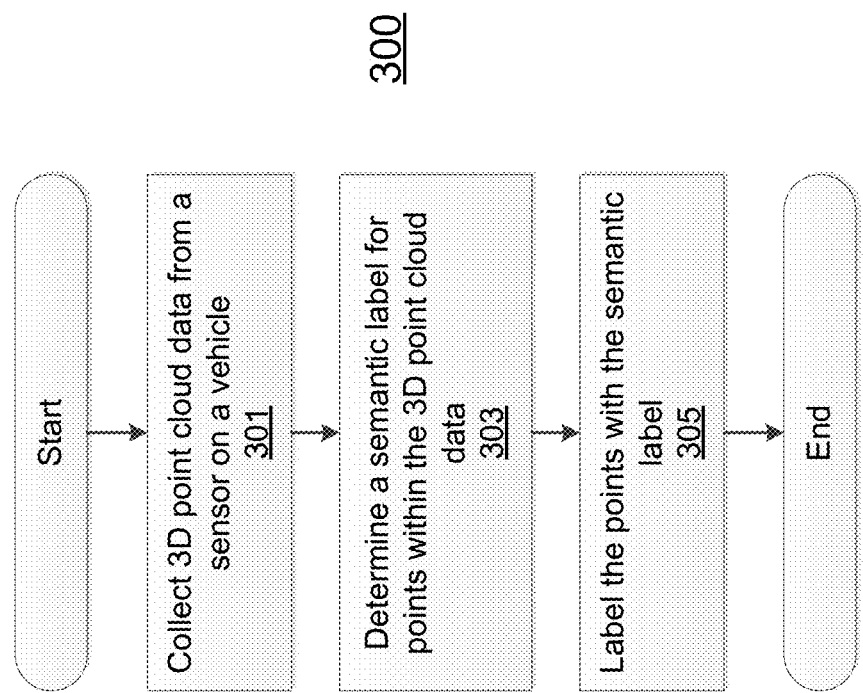
FIG. 3 shows a flowchart illustrating a flow of a mapping phase for labeling a point cloud management system according to one exemplary embodiment.

FIG. 3 shows a flowchart illustrating a flow of a mapping phase for labeling a point cloud management system according to one exemplary embodiment. In step 301, the point cloud manager 101 collects 3D point cloud information from at least one sensor of the vehicle 110 and/or mobile device 104. The environmental information collected is often an orthographic map of ground-plane reflectivities collected from a lidar sensor. In step 303, the point cloud manager 101 determines a semantic label for points within the 3D point cloud through object identification of object within the 3D point cloud map. In step 305, the point cloud manager 101 labels the points of the point cloud with the identified semantic label of each object.

Figure 4:
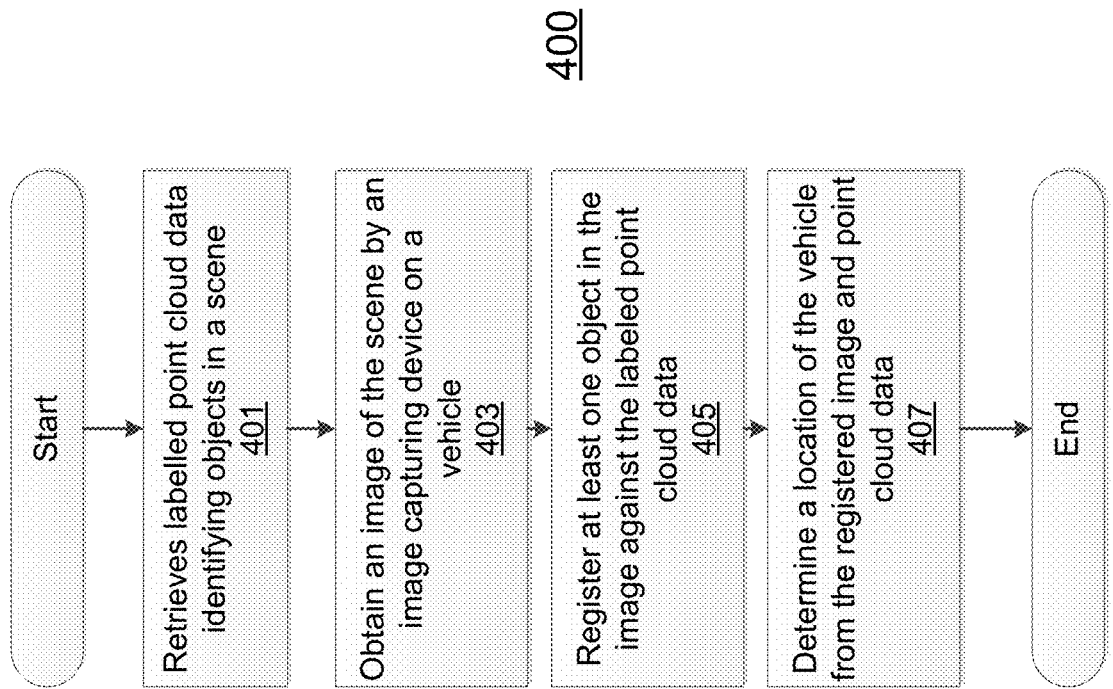
FIG. 4 shows a flowchart illustrating a flow of a deployment phase for localization using a point cloud management system according to one exemplary embodiment.

FIG. 4 shows a flowchart illustrating a flow of a deployment phase for localization using a point cloud management system according to one exemplary embodiment. In step 401, the point cloud manager 101 retrieves labeled point cloud data to identify objects in a scene. The labeling of the point cloud data is as described above in FIG. 3. In step 403, the point cloud manager 101 obtains an image of the scene by an image capturing device on a vehicle. The point cloud manager 101 collects at least one image from a camera or multiple cameras on the vehicle. Each image is scanned/searched to identify objects that are along the roadway. The identified objects may be identified through one or more means such as semantic querying, pattern/image recognition, and other machine learning methods to determine objects within the environmental data. Each identified object may be placed within a class of objects for labeling and each identified object is labeled within the image with the class.

In step 405, the point cloud manager 101 registers at least one object in the image against the labeled point cloud data. The point cloud manager 101 projects the identified object (s) in the image onto the 3D point cloud. The projection of the image to the 3D point cloud provides for a coinciding of the identified object(s) with the labeled points of the point cloud. In step 407, the point cloud manager 101 determines a location of the vehicle from the registered image and 3D point cloud data. The location is determined by finding the view which most coincides with the identified object(s) within the image to the 3D point cloud. Based on this found view, the vehicle may be more accurately localized.

Next, a hardware description of the server 100 according to exemplary embodiments is described with reference to FIG. 5. In FIG. 5, the server 100 includes a CPU 500 which performs the processes described above/below. The process data and instructions may be stored in memory 502. These processes and instructions may also be stored on a storage medium disk 504 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the server 100 communicates, such as a server or computer.

Further, the claimed advancements may be provided as a utility application, background daemon, or component of an operating system, or combination thereof, executing in conjunction with CPU 500 and an operating system such as Microsoft Windows 7, UNIX, Solaris, LINUX, Apple MAC-OS and other systems known to those skilled in the art.

In order to achieve the server 100, the hardware elements may be realized by various circuitry elements, known to those skilled in the art. For example, CPU 500 may be a Xenon or Core processor from Intel of America or an Opteron processor from AMD of America, or may be other processor types that would be recognized by one of ordinary skill in the art. Alternatively, the CPU 500 may be implemented on an FPGA, ASIC, PLD or using discrete logic circuits, as one of ordinary skill in the art would recognize. Further, CPU 500 may be implemented as multiple processors cooperatively working in parallel to perform the instructions of the inventive processes described above.

The server 100 in FIG. 5 also includes a network controller 506, such as an Intel Ethernet PRO network interface card from Intel Corporation of America, for interfacing with network 102. As can be appreciated, the network 102 can be a public network, such as the Internet, or a private network such as an LAN or WAN network, or any combination thereof and can also include PSTN or ISDN sub-networks. The network 102 can also be wired, such as an Ethernet network, or can be wireless such as a cellular network including EDGE, 3G and 4G wireless cellular systems. The wireless network can also be WiFi, Bluetooth, or any other wireless form of communication that is known.

The server 100 further includes a display controller 508, such as a NVIDIA GeForce GTX or Quadro graphics adaptor from NVIDIA Corporation of America for interfacing with display 510, such as a Hewlett Packard HPL2445w LCD monitor. A general purpose I/O interface 512 interfaces with a keyboard and/or mouse 514 as well as a touch screen panel 516 on or separate from display 510. General purpose I/O interface also connects to a variety of peripherals 518 including printers and scanners, such as an OfficeJet or DeskJet from Hewlett Packard.

A sound controller 520 is also provided in the server 100, such as Sound Blaster X-Fi Titanium from Creative, to interface with speakers/microphone 522 thereby providing sounds and/or music.

The general purpose storage controller 524 connects the storage medium disk 504 with communication bus 526, which may be an ISA, EISA, VESA, PCI, or similar, for interconnecting all of the components of the server 100. A description of the general features and functionality of the display 510, keyboard and/or mouse 514, as well as the display controller 508, storage controller 524, network controller 506, sound controller 520, and general purpose I/O interface 512 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in the circuitry on a single chipset.

Figure 6:
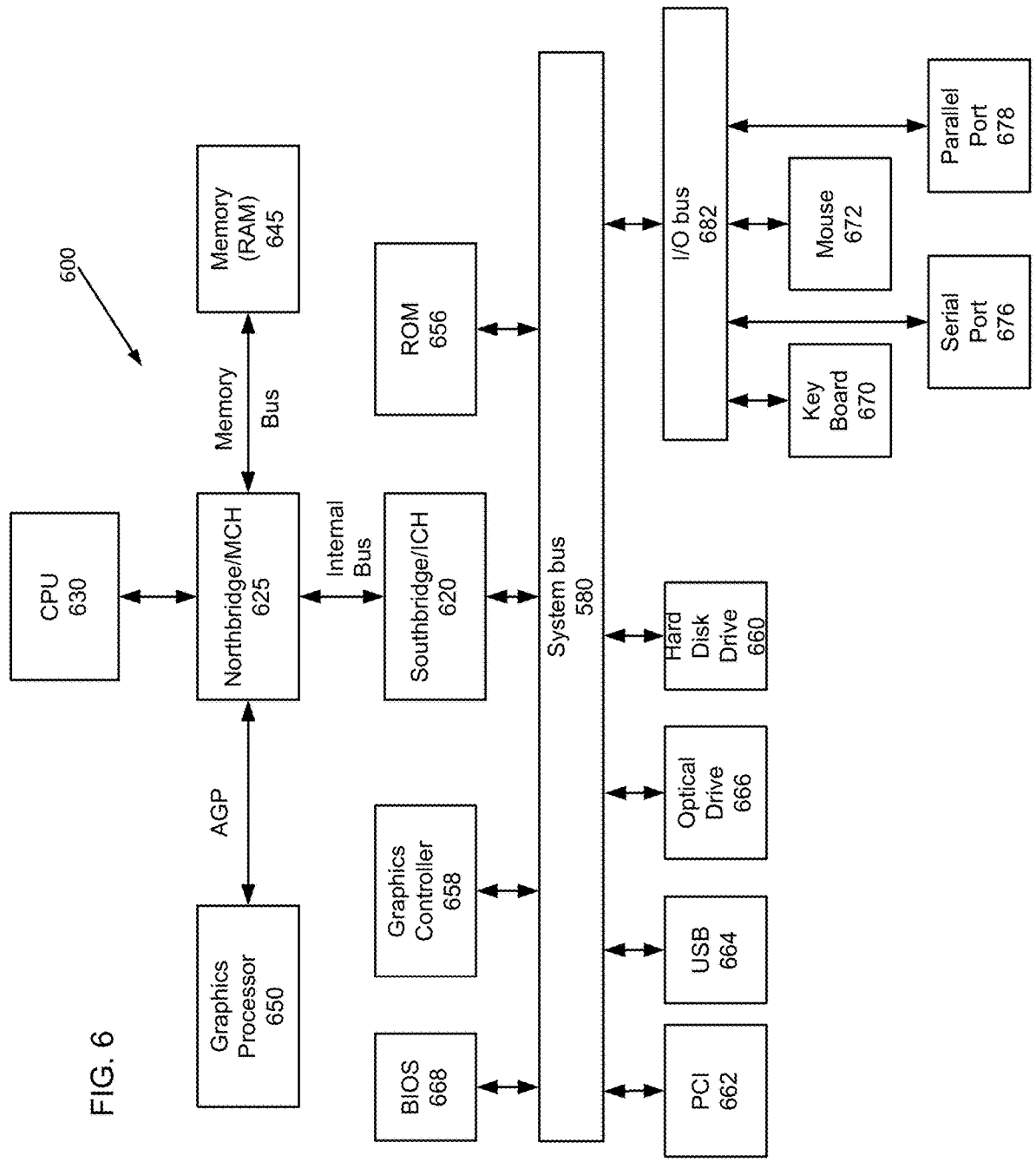
FIG. 6 shows an exemplary block diagram of a data processing system according to one exemplary embodiment.

FIG. 6 shows a schematic diagram of a data processing system, according to certain embodiments, for point cloud localization. The data processing system is an example of a computer in which specific code or instructions implementing the processes of the illustrative embodiments may be located to create a particular machine for implementing the above-noted process.

Figure 7:
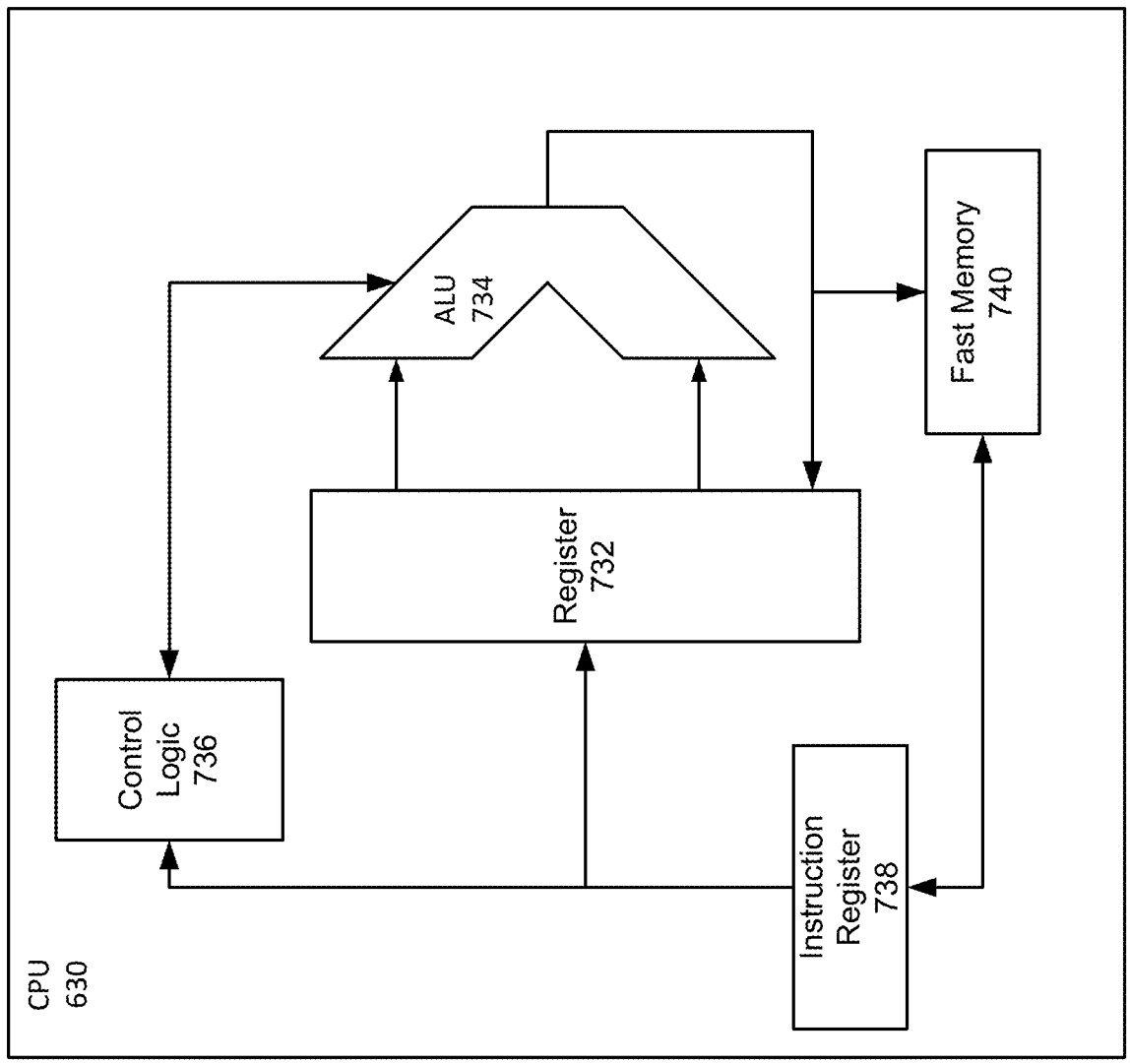
FIG. 7 shows an exemplary block diagram of a central processing unit according to one exemplary embodiment.

In FIG. 6, data processing system 600 employs a hub architecture including a north bridge and memory controller hub (NB/MCH) 625 and a south bridge and input/output (I/O) controller hub (SB/ICH) 620. The central processing unit (CPU) 630 is connected to NB/MCH 625. The NB/MCH 625 also connects to the memory 645 via a memory bus, and connects to the graphics processor 650 via an accelerated graphics port (AGP). The NB/MCH 625 also connects to the SB/ICH 620 via an internal bus (e.g., a unified media interface or a direct media interface). The CPU Processing unit 630 may contain one or more processors and may even be implemented using one or more heterogeneous processor systems. For example, FIG. 7 shows one implementation of CPU 630.

Further, in the data processing system 600 of FIG. 6, SB/ICH 620 is coupled through a system bus 680 to an I/O Bus 682, a read only memory (ROM) 656, an universal serial bus (USB) port 664, a flash binary input/output system (BIOS) 668, and a graphics controller 658. In one implementation, the I/O bus can include a super I/O (SIO) device.

PCI/PCIe devices can also be coupled to SB/ICH 620 through a PCI bus 662. The PCI devices may include, for example, Ethernet adapters, add-in cards, and PC cards for notebook computers. Further, the hard disk drive (HDD) 660 and optical drive 666 can also be coupled to the SB/ICH 620 through the system bus 680. The Hard disk drive 660 and the optical drive or CD-ROM 666 can use, for example, an integrated drive electronics (IDE) or serial advanced technology attachment (SATA) interface.

In one implementation, a keyboard 670, a mouse 672, a serial port 676, and a parallel port 678 can be connected to the system bus 680 through the I/O bus 682. Other peripherals and devices that can be connected to the SB/ICH 620 include a mass storage controller such as SATA or PATA (Parallel Advanced Technology Attachment), an Ethernet port, an ISA bus, a LPC bridge, SMBus, a DMA controller, and an Audio Codec (not shown).

In one implementation of CPU 630, the instruction register 738 retrieves instructions from the fast memory 740. At least part of these instructions are fetched from the instruction register 738 by the control logic 736 and interpreted according to the instruction set architecture of the CPU 630. Part of the instructions can also be directed to the register 732. In one implementation, the instructions are decoded according to a hardwired method, and in another implementation, the instructions are decoded according a microprogram that translates instructions into sets of CPU configuration signals that are applied sequentially over multiple clock pulses. After fetching and decoding the instructions, the instructions are executed using the arithmetic logic unit (ALU) 734 that loads values from the register 732 and performs logical and mathematical operations on the loaded values according to the instructions. The results from these operations can be feedback into the register and/or stored in the fast memory 740. According to certain implementations, the instruction set architecture of the CPU 630 can use a reduced instruction set architecture, a complex instruction set architecture, a vector processor architecture, a very large instruction word architecture. Furthermore, the CPU 630 can be based on the Von Neuman model or the Harvard model. The CPU 630 can be a digital signal processor, an FPGA, an ASIC, a PLA, a PLD, or a CPLD. Further, the CPU 630 can be an x86 processor by Intel or by AMD; an ARM processor, a Power architecture processor by, e.g., IBM; a SPARC architecture processor by Sun Microsystems or by Oracle; or other known CPU architecture.

The present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The functions and features described herein may also be executed by various distributed components of a system. For example, one or more processors may execute these system functions, wherein the processors are distributed across multiple components communicating in a network. The distributed components may include one or more client and server machines, which may share processing in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

The hardware description above, exemplified by any one of the structure examples shown in FIG. 5, 6, or 7, constitutes or includes specialized corresponding structure that is programmed or configured to perform the algorithms described in FIGS. 2-4. For example, the algorithms described in FIGS. 2-4 may be completely performed by the circuitry included in the single device shown in FIG. 5 or the data processing system as shown in FIG. 6.

A system that includes the features in the foregoing description provides numerous advantages to users. In particular, the methodology described herein has the advantage to accurately localize a vehicle or mobile device through object labeling of a 3D point cloud. In addition, the system facilitates and improves the consistency and accuracy of 3D point cloud labels.

The features described herein provide a way to localize a vehicle using a 3D point cloud. The system identifies objects within a scene using images and labels the objects to be registered against the 3D point cloud. The registration of the objects is then used to localize the vehicle. Thus, the system and associated methodology described herein amount to significantly more than an abstract idea based on the improvements and advantages described herein.

Obviously, numerous modifications and variations are possible in light of the above teachings. It is therefore to be understood that within the scope of the appended claims, the application may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. A point cloud management device comprising:
a database that stores labeled point cloud data; and
processing circuitry configured to
retrieve the labeled point cloud data, the labeled point cloud data identifying objects of a scene,
obtain an image of the scene captured by an image capturing device of a mobile device in a vehicle that is not part of the vehicle,
identify at least one object in the image of the scene,
label the identified at least one object in the image of the scene,
register the labeled at least one object in the image of the scene against the labeled point cloud data, the registration including a projection of the labeled at least one object in the image of the scene to the labeled point cloud data such that a label of each point in the point cloud that coincides with the identified at least one object is registered with the label of the identified at least one object, and
determine a location of the vehicle from the registered at least one object in the image of the scene and the registered point cloud data.

2. The point cloud management device according to claim 1, wherein the processing circuitry is further configured to:
collect unlabeled point cloud data from one of (i) a sensor of the vehicle accessed by the mobile device in the vehicle that is not part of the vehicle and (ii) a sensor of the mobile device that is different from the image capturing device of the mobile device,
determine a semantic label for at least one point within the unlabeled point cloud data, and
label the at least one point of the point cloud data with the semantic label.

3. The point cloud management device according to claim 1, wherein the processing circuitry is further configured to:
perform a semantic querying to identify the at least one object in the image of the scene, and
label the at least one object in the image of the scene with a semantic label associated with the identification.

4. The point cloud management device according to claim 3, wherein the identification of the at least one object in the image of the scene is based on a time and location of when the image was captured by the image capturing device of the mobile device.

5. The point cloud management device according to claim 3, wherein the identification of the at least one object in the image of the scene is based on dynamic image element removal.

6. A localization method for a vehicle using point cloud data comprising:
retrieving labeled point cloud data, the labeled point cloud data identifying objects of a scene;
obtaining an image of the scene captured by an image capturing device of a mobile device in a vehicle that is not part of the vehicle;
identifying at least one object in the image of the scene;
labelling, by a processor, the identified at least one object in the image of the scene;
registering, by the processor, the labeled at least one object in the image of the scene against the labeled point cloud data, the registering including a projection of the labeled at least one object in the image of the scene to the labeled point cloud data such that a label of each point in the point cloud that coincides with the identified at least one object is registered with the label of the identified at least one object; and
determining, by the processor, a location of the vehicle from the registered at least one object in the image of the scene and the labeled point cloud data.

7. The localization method according to claim 6, further comprising:
collecting unlabeled point cloud data from one of (i) a sensor of the vehicle accessed by the mobile device in the vehicle that is not part of the vehicle and (ii) a sensor of the mobile device that is different from the image capturing device of the mobile device;
determining, by the processor, a semantic label for at least one point within the unlabeled point cloud data; and
labeling, by the processor, the at least one point of the point cloud data with the semantic label.

8. The localization method according to claim 6, further comprising:
performing a semantic query, by the processor, to identify the at least one object in the image of the scene; and labeling, by the processor, the at least one object in the image of the scene with a semantic label associated with said identifying.

9. The localization method according to claim 8, wherein said identifying of the at least one object in the image of the scene is based on a time and location of when the image was captured by the image capturing device of the mobile device.

10. The localization method according to claim 8, wherein said identifying of the at least one object in the image of the scene is based on dynamic image element removal.

11. A non-transitory computer-readable storage medium storing computer-readable instructions that, when executed by one or more computers, cause the one or more computers to perform a method comprising:
  retrieving labeled point cloud data, the labeled point cloud data identifying objects of a scene;
  obtaining the image of the scene captured by an image capturing device of a mobile device in a vehicle that is not part of the vehicle;
  identifying at least one object in the image of the scene;
  labelling the identified at least one object in the image of the scene;
  registering the labeled at least one object in the image of the scene against the labeled point cloud data, the registering including a projection of the labeled at least one object in the image of the scene to the labeled point cloud data such that a label of each point in the point cloud that coincides with the identified at least one object is registered with the label of the identified at least one object; and
  determining a location of the vehicle from the registered at least one object in the image of the scene and the labeled point cloud data.

12. The non-transitory computer-readable storage medium according to claim 11, the method further comprising:
  collecting unlabeled point cloud data from one of (i) a sensor of the vehicle accessed by the mobile device in the vehicle that is not part of the vehicle and (ii) a sensor of the mobile device that is different from the image capturing device of the mobile device;
  determining a semantic label for at least one point within the unlabeled point cloud data; and
  labeling the at least one point within the point cloud data with the semantic label.

13. The non-transitory computer-readable storage medium according to claim 11, the method further comprising:
  performing a semantic query to identify the at least one object in the image of the scene; and
  labeling the at least one object in the image of the scene with a semantic label associated with said identifying.

14. The non-transitory computer-readable storage medium according to claim 13, wherein said identifying of the at least one object in the image of the scene is based on a time and location of when the image was captured by the image capturing device of the mobile device.

* * * * *